United States Patent
Anders et al.

(10) Patent No.: US 11,495,217 B2
(45) Date of Patent: Nov. 8, 2022

(54) AUTOMATED ASSISTANTS THAT ACCOMMODATE MULTIPLE AGE GROUPS AND/OR VOCABULARY LEVELS

(71) Applicant: Google LLC, Mountain View, CA (US)

(72) Inventors: Pedro Gonnet Anders, Zurich (CH); Victor Carbune, Winterthur (CH); Daniel Keysers, Stallikon (CH); Thomas Deselaers, Zurich (CH); Sandro Feuz, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 211 days.

(21) Appl. No.: 16/728,582

(22) Filed: Dec. 27, 2019

(65) Prior Publication Data
US 2020/0135181 A1    Apr. 30, 2020

Related U.S. Application Data

(63) Continuation of application No. 15/954,174, filed on Apr. 16, 2018, now Pat. No. 10,573,298.

(51) Int. Cl.
*G10L 15/18* (2013.01)
*G10L 15/22* (2006.01)
*G10L 15/19* (2013.01)

(52) U.S. Cl.
CPC .......... *G10L 15/1815* (2013.01); *G10L 15/19* (2013.01); *G10L 15/22* (2013.01); *G10L 2015/223* (2013.01)

(58) Field of Classification Search
None
See application file for complete search history.

(56) References Cited

U.S. PATENT DOCUMENTS 7,519,529 B1  4/2009 Horvitz
10,038,938 B1  7/2018 Roe et al.
(Continued)

FOREIGN PATENT DOCUMENTS

CN   106648082   5/2017
CN   107507612   12/2017
(Continued)

OTHER PUBLICATIONS

Japanese Patent Office; Notice of Reasons for Rejection issued in Application No. 2020556879; 11 pages; dated Apr. 26, 2021.
(Continued)

*Primary Examiner* — Brian L Albertalli
(74) *Attorney, Agent, or Firm* — Middleton Reutlinger

(57) ABSTRACT

Techniques are described herein for enabling an automated assistant to adjust its behavior depending on a detected age range and/or "vocabulary level" of a user who is engaging with the automated assistant. In various implementations, data indicative of a user's utterance may be used to estimate one or more of the user's age range and/or vocabulary level. The estimated age range/vocabulary level may be used to influence various aspects of a data processing pipeline employed by an automated assistant. In various implementations, aspects of the data processing pipeline that may be influenced by the user's age range/vocabulary level may include one or more of automated assistant invocation, speech-to-text ("STT") processing, intent matching, intent resolution (or fulfillment), natural language generation, and/ or text-to-speech ("TTS") processing. In some implementations, one or more tolerance thresholds associated with one or more of these aspects, such as grammatical tolerances, vocabularic tolerances, etc., may be adjusted.

20 Claims, 7 Drawing Sheets

(56) References Cited

U.S. PATENT DOCUMENTS

| | | | |
|---|---|---|---|
| 10,311,869 B2* | 6/2019 | Weng | G06N 5/02 |
| 10,573,298 B2* | 2/2020 | Anders | G10L 15/19 |
| 2004/0215453 A1* | 10/2004 | Orbach | G10L 15/005 |
| | | | 704/E15.04 |
| 2006/0122840 A1* | 6/2006 | Anderson | G10L 13/033 |
| | | | 704/E15.04 |
| 2006/0229873 A1 | 10/2006 | Eide et al. | |
| 2006/0287850 A1 | 12/2006 | Morikawa | |
| 2008/0065388 A1* | 3/2008 | Cross | G10L 13/00 |
| | | | 704/270 |
| 2013/0332170 A1 | 12/2013 | Melamed | |
| 2014/0074473 A1 | 3/2014 | Takei et al. | |
| 2014/0337131 A1 | 11/2014 | Edara | |
| 2015/0106096 A1 | 4/2015 | Toopran et al. | |
| 2015/0206533 A1 | 7/2015 | Jin et al. | |
| 2015/0332665 A1 | 11/2015 | Mishra et al. | |
| 2016/0259308 A1 | 9/2016 | Fadell et al. | |
| 2016/0260135 A1 | 9/2016 | Zomet et al. | |
| 2016/0372110 A1 | 12/2016 | Waltermann et al. | |
| 2017/0116986 A1 | 4/2017 | Weng et al. | |
| 2017/0358305 A1 | 12/2017 | Kudurshian et al. | |
| 2018/0053514 A1 | 2/2018 | Singh et al. | |
| 2018/0068031 A1 | 3/2018 | Hewavitharana et al. | |
| 2018/0108343 A1* | 4/2018 | Stevans | G10L 13/00 |
| 2018/0166074 A1 | 6/2018 | Aggarwal et al. | |
| 2018/0182385 A1* | 6/2018 | Stahl | G10L 15/19 |
| 2018/0277117 A1 | 9/2018 | Hergenroeder | |
| 2018/0308487 A1 | 10/2018 | Goel et al. | |
| 2019/0221225 A1* | 7/2019 | Bricklin | G10L 17/22 |
| 2019/0235831 A1 | 8/2019 | Bao | |
| 2019/0325875 A1* | 10/2019 | Gupta | G10L 15/22 |

FOREIGN PATENT DOCUMENTS

| | | |
|---|---|---|
| CN | 107910004 | 3/2018 |
| JP | 2009104020 | 5/2009 |
| JP | 2015055653 | 3/2015 |
| JP | 2018049588 | 3/2018 |
| JP | 2019182244 | 10/2019 |
| WO | 2019000991 | 1/2019 |

OTHER PUBLICATIONS

Japanese Patent Office; Notice of Final Office Action issued in Application No. 2020556879; 6 pages; dated Oct. 4, 2021.

"Amazon.com Help: About Amazon Households." https://www.amazon.com/gp/help/customer/display.html?nodeId=201806360&tag=dt-incontent-btn-20&tag=dt-incontent-btn-20. Last accessed Jan. 30, 2018. 2 pages.

Lomas, N., "Oyoty is a chatbot designed to teach kids to be safe online." https://techcrunch.com/2016/10/19/oyoty-is-a-chatbot-designed-to-teach-kids-to-be-safe-online/ Posted Oct. 19, 2016. Last accessed on Jan. 30, 2018. 15 pages.

Moore, C., "Keep your kids from spending hundreds of dollars and more ways of parenting with Alexa." https://www.digitaltrends.com/home/amazon-alexa-kid-friendly/ Posted Feb. 12, 2017. Last accessed on Jan. 30, 2018. 5 pages.

Perez, S., "Amazon adds parental consent to Alexa skills aimed at children, launches first legal kids' skills." https://techcrunch.com/2017/02/31/amazon-adds-parental-consent-to-alexa-skills-aimed-at-children-launches-first-legal-kids-skills/. Posted Aug. 31, 2017. Last accessed on Jan. 30, 2018. 11 pages.

European Patent Office; International Search Report and Written Opinion of Ser. No. PCT/US2019/027598; 14 pages; dated Jul. 26, 2019.

Korean Intellectual Property Office: Notice of Office Action issued in Application No. 10-2020-7032814 dated Jan. 5, 2022. 63 pages.

Intellectual Property India: Examination Report issued for Application No. 202027047813 dated Dec. 6, 2021. 6 pages.

European Patent Office; Communication pursuant to Article 94(3) EPC issued in Application No. 19720325.0; 5 pages; dated Dec. 17, 2021.

Japanese Patent Office; Notice of Allowance issued in Application No. 2020-556879, 3 pages, dated Mar. 22, 2022.

The Korean Intellectual Property Office; Notice of Allowance issued for Application No. 10-2020-7032814, 3 pages, dated Jun. 21, 2022.

\* cited by examiner

AUTOMATED ASSISTANTS THAT ACCOMMODATE MULTIPLE AGE GROUPS AND/OR VOCABULARY LEVELS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may include vocal utterances converted into text and then processed and/or typed free form natural language input.

Users may engage with automated assistants using a variety of different types of computing devices, such as smart phones, laptop computers, tablet computers, and so forth. "Assistant devices" are computing devices that are designed primarily or even exclusively to facilitate human-to-computer dialogs between users and automated assistants. One common example of an assistant device is a standalone interactive speaker which enables users to vocally engage with an automated assistant, e.g., by uttering a predetermined invocation phrase to activate the automated assistant so that the automated assistant can respond to the user's next utterance(s).

The focus of assistant devices on vocal interaction makes them especially suitable for use by children. However, many features built into or otherwise accessible using commercially-available automated assistants may not be suitable for children. For example, if a child were to ask if the Tooth Fairy were real, a conventional automated assistant may, based on documents located online, reply, "No, the Tooth Fairy is an imaginary character evoked by parents to incentivize children to pull loose teeth." As another example, an automated assistant may be configured to engage with independent agents, such as third party applications, that enable users to order goods/services, such as pizza, movies, toys, etc.—this type of capability could be used by children who may not be able to judge all the consequences of their actions. Additionally, conventional automated assistants are designed to interact with people having fully-developed vocabularies. If a user's input is not sufficiently clear, the automated assistant may request clarification and/or disambiguation, rather than attempt to resolve the user's request based on a "best guess" as to the user's intent. Such a long back and forth may cause excess consumption of various computer and/or network resources (e.g., as a result of generating and rendering the requests for clarification and/or processing the resulting input) and/or may be frustrating for children with limited vocabularies.

SUMMARY

Techniques are described herein for enabling an automated assistant to adjust its behavior depending on a detected age range and/or "vocabulary level" of the user who is engaging with the automated assistant. Consequently, the automated assistant is able to use one mode, such as a "kid's mode," when interacting with children and another mode, such as "normal" or "adult" mode, while interacting with users who are not deemed to be children (e.g., teenagers and older). In some implementations, an automated assistant may be capable of transitioning between a series of modes, each associated with a particular age range (or, alternatively, between a series of modes associated with a plurality of vocabulary levels). Various aspects of the automated assistant's behavior may be affected by the mode selected based on the age range (or vocabulary level) of the user, such as (i) recognition of the user's intent, (ii) resolving the user's intent, and (iii) how the results of resolving the user's intent are output.

As described in more detail herein, various implementations can enable an automated assistant to generate responses to various inputs that, absent techniques described herein, would not be resolvable. As also described herein, various implementations can mitigate the need for an automated assistant to request clarification for various inputs, thereby conserving various computer and/or network resources that would otherwise be utilized to generate and render such requests for clarification and/or process further input responsive to the requests for clarification. Further, automated assistants configured with selected aspects of the present disclosure may facilitate more effective interaction with users in situations in which the users may ordinarily have difficulty interacting with assistant devices. This may occur, for instance, when a user's speech is less clear than that of the average user of such devices, (e.g. when the subsequent user is a young child, has a disability which affects the clarity of their speech, and/or is a non-native speaker).

While examples herein primarily involve determining a user's age range and acting accordingly, this is not meant to be limiting. A variety of user characteristics, such as gender, location, etc., may be detected and used to influence the automated assistant's behavior. For example, in some implementations, a user's vocabulary level may be estimated, rather than their age range, so that younger users with more advanced vocabularies will be engaged with appropriately by automated assistants (i.e. so that advance-vocabulary children are not "talked down to" by automated assistants). Similarly, older users with adult-sounding voices but limited vocabularies (e.g., due to learning disabilities, non-native languages, etc.) may be engaged by automated assistants in a manner that is conducive to their limited vocabularies. Moreover, when an automated assistant communicates with a user at the same vocabulary level that is used by the user, this may make the user aware of the fact that he or she has "dumbed-down" his or her language when communicating with the automated assistant. This might encourage the user to speak more naturally.

An automated assistant configured with selected aspects of the present disclosure may be configured to enter into various age-related modes, such as "standard" (e.g., suitable for adults) and "kid's mode" (suitable, for instance, for small children), based on various signals. In some implementations, parents or other adults (e.g., guardians, teachers) may manually transition the automated assistant into a kid's mode, e.g., on demand and/or during scheduled time intervals during which children are likely to be engaged with the automated assistant.

Additionally or alternatively, in some embodiments, the automated assistant may automatically detect (e.g., predict, estimate) a user's age range, e.g., based on characteristic(s) of the user's voice such as cadence, pitch, phonemes, vocabulary, grammar, pronunciation, etc. In some implementations, a machine learning model may be trained to generate, based on data indicative of a user's spoken utterance (e.g., audio recording, feature vector, embedding), output that is indicative of a predicted age of the user. For example, a feed forward neural network may be trained, e.g., using training examples in the form of audio samples labeled with the speakers' ages (or age ranges), to generate multiple probabilities associated with multiple age ranges (e.g., Age 2-4: 25%; Age 5-6: 38%; Age 7-9: 22%; Age 10-14: 10%; Age <14: 5%). In various implementations, the age range with the highest probability may be selected as the de facto age range of the user. In other implementations, other types of artificial intelligence models and/or algorithms may be employed to estimate a user's age.

Additionally or alternatively, in some implementations, voice recognition may be employed by automated assistants, e.g., in response to configuration by one or more users, to distinguish between and identify individual speakers. For example, a family may configure one or more assistant devices in their home to recognize all family members' voices, so that each member's profile may be active when that member engages with the automated assistant. In some such implementations, each family member's profile may include their age (e.g., a date of birth), so that upon identifying the speaker, the automated assistant is also able to determine the speaker's age.

Once the user's/speaker's age and/or age range (or vocabulary level) is determined, it may affect various aspects of how the automated assistant operates. For example, in some implementations, when the speaker is determined to be a child (or another user having limited language abilities), the automated assistant may be less rigid about what utterances will qualify as invocation phrases than if the speaker is determined to be an adult or otherwise a proficient speaker. In some implementations, one or more on-device models (e.g., trained artificial intelligence models) may be used, e.g., locally on the client device, to detect predetermined invocation phrases. If the speaker is detected to be a child, in some implementations, an invocation model specifically designed for children may be employed. Additionally or alternatively, if a single invocation model is used for all users, one or more thresholds that must be satisfied to classify a user's utterance as a proper invocation may be lowered, e.g., so that a child's mispronounced attempt at invocation may nonetheless be classified as a proper invocation phrase.

As another example, the user's estimated age range and/or vocabulary level may be used in detecting the user's intent. In various implementations, one or more candidate "query understanding models," each associated with a specific age range, may be available for use by the automated assistant. Each query understanding model may be usable to determine the user's intent, but may operate differently than other query understand models. A "standard" query understanding model designed for adults may have a particular "grammatical tolerance" that is lower than, for instance, a grammatical tolerance associated with a "kid's" query understanding model. For example, the kid's query understanding model may have a grammatical tolerance (e.g., a minimum confidence threshold) that allows the automated assistant considerable leeway to "guess" the user's intent even when the user's grammar/vocabulary is imperfect, as would typically be the case with young children. By contrast, when the automated assistant selects the "standard" query understanding model, it may have a lower grammatical tolerance and therefore may be quicker to seek disambiguation and/or clarification from the user, rather than "guessing" or selecting a relatively low-confidence candidate intent as the user's actual intent.

Additionally or alternatively, in some implementations, the query understanding model may affect speech-to-text ("STT") processing employed by, or on behalf of, the automated assistant. For example, a conventional STT processor might not be able to process a child's utterance of "meow like giggy." Instead of generating speech recognition output (e.g., text) that tracks the phonetic sound made by the user, the STT process may simply reject the utterance (e.g., because the words were not identified in a dictionary), and the automated assistant may say something like, "I'm sorry, I didn't catch that." However, an STT processor configured with selected aspects of the present disclosure may, in response to a determination that the speaker is a child, be more tolerant of mispronunciation and/or subpar grammar/vocabulary. When a child speaker is detected, an STT processor generate speech recognition output (e.g., a textual interpretation of the utterance, an embedding, etc.) that tracks the phonetic sound made by the user even if the speech recognition output includes some words/phrases that are not found in a dictionary. Likewise, a natural language understanding module may utilize a child-centric query understanding model to interpret the text "giggy" as "kitty," whereas if an adult-centric query understand model were used, the term "giggy" may not be interpretable.

In some implementations, a STT processor may use a dedicated parsing module when processing the simplified grammar used by children. In some such implementations, the dedicated parsing module may use STT models that are trained using existing technologies, but with noisier (e.g., incomplete, grammatically ambiguous, etc.) training data. For example, in some implementations, the training data may be generated at least partially from data generated originally from adults, but transformed according to a model of children's vocal tract forms and/or by adding noise to textual input to represent incomplete grammar.

Generally speaking, an automated assistant configured with selected aspects of the present disclosure may be more proactive when engaging with children than conventional automated assistants. For example, and as described previously, it may be more willing to "guess" what a child's intent is. Additionally, the automated assistant may be more lax about requiring invocation phrases when it detects a child speaker. For example, in some implementations, if a child shouts an animal name, the automated assistant may, upon determining that the speaker is a child, forego the requirement that the child speak an invocation phrase, and may instead mimic a sound the animal makes. Additionally or alternatively, the automated assistant may attempt to "teach" a child proper grammar, pronunciation, and/or vocabulary, e.g., in response to a grammatically incorrect and/or mispronounced utterance.

Regarding resolution of the user's intent, various actions and/or information may not be suitable for children. Accordingly, in various embodiments, based on the predicted age range of the user, the automated assistant may determine whether the intent of the user is resolvable. For example, if the user is determined to be a child, the automated assistant may limit the online corpuses of data it can use to retrieve information responsive to the user's request, e.g., to a "whitelist" of kid-friendly websites and/or away from a "blacklist" of non-kid-friendly websites. The same might apply, for instance, to music. If a child says, "play music!", the automated assistant may limit the music it plays to a library of kid-friendly music, rather than an adult-centric library that includes music commonly targeted towards older individuals. The automated assistant also may not require that a child user specify a playlist or artist, and may simply play music appropriate for the user's detected age. By contrast, an adult's request to "play music" may cause an automated assistant to seek additional information about what music to play. In some such implementations, the volume may be adjusted as well when the automated assistant is in kid's mode, e.g., to have a lower limit than would otherwise be available with adults. As another example, various actions, such as ordering goods/services through third party applications, may not be suitable for children. Accordingly, when the automated assistant determines that it is engaging with a child, it may refuse to perform various actions that might, for instance, cost money, or facilitate engagement with strangers online.

Regarding outputting the results of resolving the user's intent, in various embodiments, the automated assistant may select, from a plurality of candidate voice synthesis models, a given voice synthesis model that is associated with the predetermined age group predicted for the user. For example, a default voice synthesis model employed by the automated assistant may be an adult voice that speaks at a relatively rapid pace (e.g., similar to real life conversation between adults). By contrast, a voice synthesis model employed by an automated assistant when engaged with a child user may be the voice of a cartoon character, and/or may speak at a relatively slower pace.

Additionally or alternatively, in some implementations, more or fewer details may be output by the automated assistant depending on the predicted age of the user. This may be accomplished, for instance, by making available a plurality of natural language generation models, each tailored to a particular age group. As an example, when engaged with a user determined to be between two and four, the automated assistant may employ a suitable natural language generation model to cause the automated assistant to use simple words and short sentences. As the detected age of the speaker increases, the vocabulary used by the automated assistant may grow (e.g., in accordance with the natural language generation model it selects) such that it uses longer sentences and more complex or advanced words. In some embodiments, the automated assistant may provide output that encourages the child user to speak in more complete sentences, suggests alternative words, etc. In some implementations, terms and/or phrases that normally would not require explanation to an adult may be more fully-explained by the automated assistant when engaged with a child.

Additionally or alternatively, in some implementations, natural language generation ("NLG") templates may include logic dictating that one natural language output be provided when the user is estimated to be in a first age range, and another natural language output be provided when the user is estimated to be in a second age range. Thus, a child may hear output geared towards them (e.g., using terms and/or slang that are suitable for children), whereas an adult may hear different output.

As another example, one use case commonly encountered by automated assistants is summarization of a webpage (or a portion of a webpage). For example, users often ask automated assistants random questions that might be answerable using an online encyclopedia entry. The automated assistant may employ various techniques to summarize the germane portions of the webpage into a coherent answer. Using techniques described herein, an automated assistant may take an estimated age range and/or vocabulary level of the user into account when summarizing germane portions of a webpage. For example, a child may receive only the high-level and/or easily understandable concepts described in a webpage, whereas an adult may receive more details and/or description. In some embodiments, if the summarization is not only abstractive, but generative, it could even be powered by and/or combined with an automatic machine translation system (e.g., an "adult-English-to-simple-English" translation system).

In some implementations, the automated assistant may be configured to report on a child's grammatical and/or vocabularic progress. For example, when the automated assistant determines that it is engaged with an adult, or especially when it recognizes a parent's voice, the adult/parent user may ask the automated assistant about one or more children's progress with interacting with the automated assistant. In various implementations, the automated assistant may provide various data in response to such inquiries, such as words or syllables the child tends to mispronounce or struggle with, whether a tendency to stutter is detected in a child, what questions the child has asked, how the child has progressed in interactive games, and so forth.

In some implementations, a method performed by one or more processors is provided that includes: receiving, at one or more input components of one or more client devices, a vocal utterance from a user; applying data indicative of the vocal utterance across a trained machine learning model to generate output; determine, based on the output, that the user falls into a predetermined age group; selecting, from a plurality of candidate query understanding models, a given query understanding model that is associated with the predetermined age group; determining an intent of the user using the given query understanding model; determining, based on the predetermined age group, that the intent of the user is resolvable; resolving the user's intent to generate responsive data; and outputting, at one or more output components of one or more of the client devices, the responsive data.

In various implementations, the plurality of candidate query understanding models may include at least one candidate query understanding model with a grammatical tolerance that is different than a grammatical tolerance of the given query understanding model. In various implementations, the data indicative of the vocal utterance may include an audio recording of an utterance by the user, and the machine learning model is trained to generate output indicative of an age of the user based on one or more phonemes contained in the audio recording.

In various implementations, the method may further include selecting, from a plurality of candidate natural language generation models, a given natural language generation model that is associated with the predetermined age group, wherein the selected given natural language output model is used to generate the responsive data. In various implementations, the plurality of candidate natural language generation models may include at least one candidate natural language generation model that uses a more complex vocabulary than a vocabulary used by the given natural language output model.

In various implementations, the method may further include selecting, from a plurality of candidate voice synthesis models, a given voice synthesis model that is associated with the predetermined age group, wherein outputting the responsive data is performed using the given voice synthesis model. In various implementations, the given query understanding model may be applied to perform speech-to-text processing of the vocal utterance. In various implementations, the given query understanding model may be applied to perform natural language understanding of speech recognition output generated from the vocal utterance.

In another aspect, a method performed by one or more processors is provided that includes: receiving, at one or more input components of one or more client devices, a vocal utterance from a user; applying data indicative of the vocal utterance across a trained machine learning model to generate output; determine, based on the output, that the user falls into a given vocabulary level of a plurality of predetermined vocabulary levels; selecting, from a plurality of candidate query understanding models, a given query understanding model that is associated with the given vocabulary level; determining an intent of the user using the given query understanding model; determining, based on the predetermined vocabulary level, that the intent of the user is resolvable; resolving the user's intent to generate responsive data; and outputting, at one or more output components of one or more of the client devices, the responsive data.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
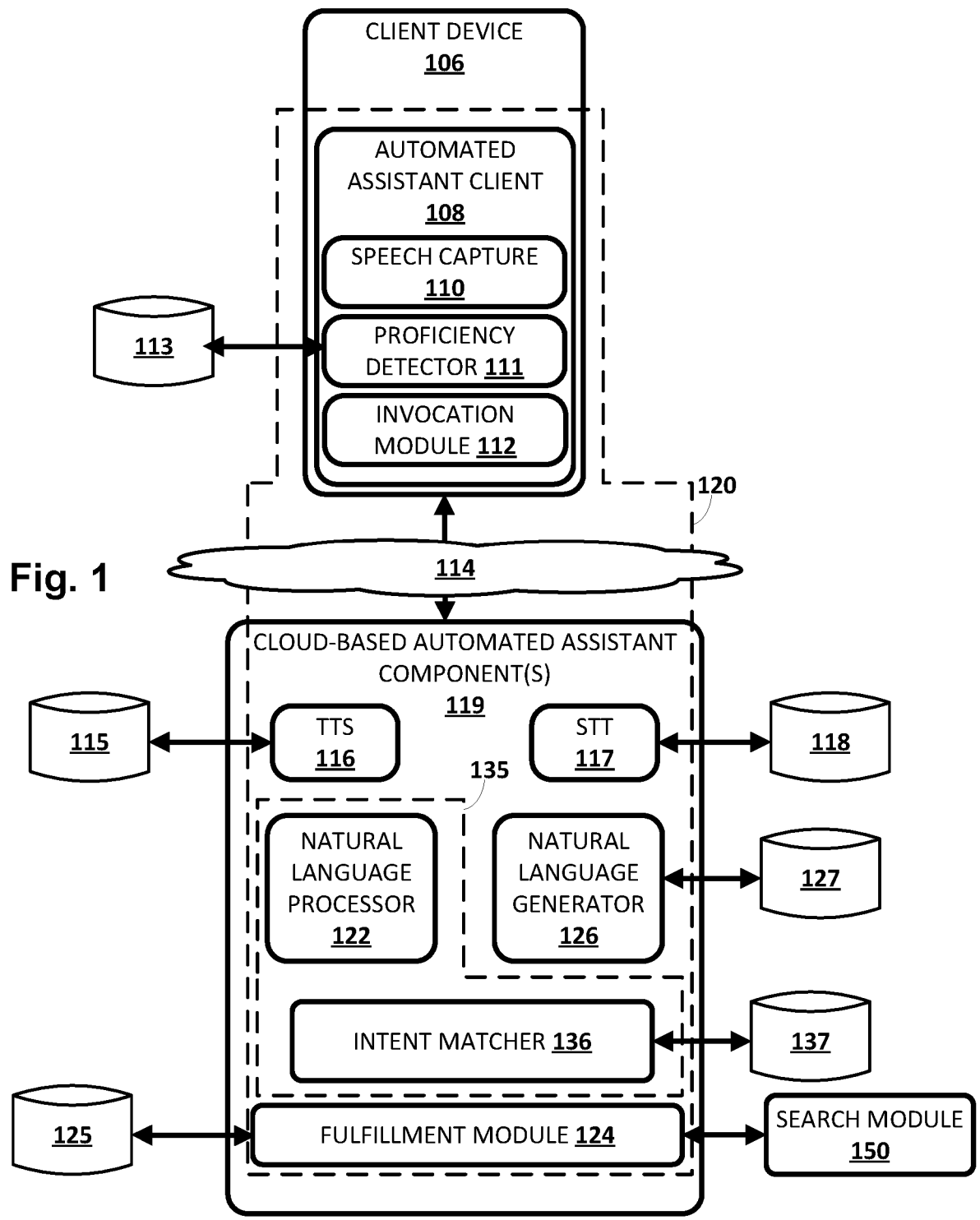
FIG. 1 is a block diagram of an example environment in which implementations disclosed herein may be implemented.

Now turning to FIG. 1, an example environment in which techniques disclosed herein may be implemented is illustrated. The example environment includes one or more client computing devices 106. Each client device 106 may execute a respective instance of an automated assistant client 108. One or more cloud-based automated assistant components 119, such as a natural language understanding module 135, may be implemented on one or more computing systems (collectively referred to as a "cloud" computing system) that are communicatively coupled to client devices $106_{1-N}$ via one or more local and/or wide area networks (e.g., the Internet) indicated generally at 114.

In various implementations, an instance of an automated assistant client 108, by way of its interactions with one or more cloud-based automated assistant components 119, may form what appears to be, from the user's perspective, a logical instance of an automated assistant 120 with which the user may engage in a human-to-computer dialog. One instance of such an automated assistant 120 is depicted in FIG. 1 in dashed line. It thus should be understood that each user that engages with an automated assistant client 108 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 108 executing on a client device 106 operated by the user and one or more cloud-based automated assistant components 119 (which may be shared amongst multiple automated assistant clients 108). It should also be understood that in some implementations, automated assistant 120 may respond to a request from any user regardless of whether the user is actually "served" by that particular instance of automated assistant 120.

The one or more client devices 106 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

As described in more detail herein, automated assistant 120 engages in human-to-computer dialog sessions with one or more users via user interface input and output devices of one or more client devices 106. In some implementations, automated assistant 120 may engage in a human-to-computer dialog session with a user in response to user interface input provided by the user via one or more user interface input devices of one of the client devices 106. In some of those implementations, the user interface input is explicitly directed to automated assistant 120. For example, a user may speak a predetermined invocation phrase, such as "OK, Assistant," or "Hey, Assistant," to cause automated assistant 120 to begin actively listening.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may utilize speech recognition to convert utterances from users into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of client computing device 106 and computing device(s) operating cloud-based automated assistant components 119 may include one or more memories for storage of data and software applications, one or more processors for accessing data and executing applications, and other components that facilitate communication over a network. The operations performed by client computing device 106 and/or by automated assistant 120 may be distributed across multiple computer systems. Automated assistant 120 may be implemented as, for example, computer programs running on one or more computers in one or more locations that are coupled to each other through a network.

As noted above, in various implementations, client computing device 106 may operate an automated assistant client 108. In various implementations, automated assistant client 108 may include a speech capture module 110, a proficiency detector 111, and/or an invocation module 112. In other implementations, one or more aspects of speech capture module 110, proficiency detector 111, and/or invocation module 112 may be implemented separately from automated assistant client 108, e.g., by one or more cloud-based automated assistant components 119. In various implementations, speech capture module 110 may interface with hardware such as a microphone (not depicted) to capture an audio recording of a user's utterance(s). Various types of processing may be performed on this audio recording for various purposes, as will be described below.

In various implementations, proficiency detector 111, which may be implemented using any combination of hardware or software, may be configured to analyze an audio recording captured by speech capture module 110 to make one or more determinations based on the user's evident speaking proficiency. In some implementations, these determinations may include a prediction or estimation of the user's age, for instance, as a classification of the user into one of a plurality of age ranges. Additionally or alternatively, these determinations may include a prediction or estimation of vocabulary level of the user, or a classification of the user into one of a plurality of vocabulary levels. As will be described below, the determinations made by proficiency detector 111 may be used, e.g., by various components of automated assistant 120, to accommodate users of multiple different age groups and/or vocabulary levels.

Proficiency detector 111 may employ a variety of techniques to make determinations about the user's speaking proficiency. For example, in FIG. 1, proficiency detector 111 is communicatively coupled with a proficiency model database 113 (which may be integral with client device 106 and/or hosted remotely from client device 106, e.g., in the cloud). Proficiency model database 113 may include one or more artificial intelligence (or machine learning) models that are trained to generate output indicative of a user's speaking proficiency. In various implementations, the artificial intelligence (or machine learning) model may be trained to generate output indicative of an age of the user based on one or more phonemes contained in the audio recording, a pitch of the user's voice detected in the audio recording, pronunciations, etc.

As one non-limiting example, a neural network may be trained (and stored in database 113) such that an audio recording of a user's utterance—or a feature vector extracted from the audio recording—may be applied as input across the neural network. In various implementations, the neural network may generate multiple outputs, each output corresponding to an age range and associated probability. In some such implementations, the age range having the highest probability may be used as a prediction of the user's age range. Such a neural network may be trained using training examples in various forms, such as audio recordings of users (or feature vectors generated therefrom) labeled with the users' respective ages (or age ranges). When a training example is applied across the network, a difference between the generated output and the label associated with the training example may be used, e.g., to minimize a loss function. Various weights of the neural network may then be adjusted, e.g., using standard techniques such as gradient descent and/or back propagation.

Speech capture module 110 may be configured to capture a user's speech, e.g., via a microphone (not depicted), as mentioned previously. Additionally or alternatively, in some implementations, speech capture module 110 may be further configured to convert that captured audio to text and/or to other representations or embeddings, e.g., using speech-to-text ("STT") processing techniques. Additionally or alternatively, in some implementations, speech capture module 110 may be configured to convert text to computer-synthesized speech, e.g., using one or more voice synthesizers. However, because client device 106 may be relatively constrained in terms of computing resources (e.g., processor cycles, memory, battery, etc.), speech capture module 110 local to client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

In some implementations, client device 106 may include an invocation module 112 that is configured to determine whether a user's utterance qualifies as an invocation phrase that should initiate a human-to-computer dialog session with automated assistant 120. Once the age (or age range) of the user is estimated by proficiency detector 111, in some implementations, invocation module 112 may analyze data indicative of the user's utterance, such as an audio recording or a vector of features extracted from the audio recording (e.g., an embedding) in conjunction with the user's estimated age range. In some implementations, a threshold that is employed by invocation module 112 to determine whether to invoke automated assistant 120 may be lowered with the estimated age of the user falls into one or more age ranges, e.g., age ranges associated with small children. Consequently, when engaging with a small child, a phrase such as "OK assisa," which is different from but somewhat phonetically similar to the proper invocation phrase, "OK assistant," nonetheless may be accepted as an invocation.

Additionally or alternatively, an on-device invocation model may be used by invocation module 112 to determine whether an utterance qualifies as an invocation. Such an on-device invocation model may be trained to detect common variations of invocation phrases. For example, in some implementations, the on-device invocation model (e.g., one or more neural networks) may be trained using training examples that each include an audio recording (or extracted feature vector) of a child's utterance. Some training examples may include children's attempts to utter a proper invocation phrase; such training examples may be positive training examples. Additionally, in some implementations, some training examples may include other utterances from children that are not attempts to speak invocation phrases. These other training examples may be used as negative training examples. The (positive and/or negative) training examples may be applied as input across the on-device invocation model to generate output. The output may be compared to labels associated with the training examples (e.g., positive or negative) and the difference (error function) may be used to train the on-device invocation model, e.g., using techniques such as gradient descent and/or back propagation. In some implementations, if the on-device invocation model indicates that an utterance qualifies as an invocation, but a confidence score associated with the output is relatively low (e.g., because the utterance was generated by a child prone to mispronunciation), the low confidence score itself may be used, e.g., by proficiency detector 111, to estimate the child's age.

Cloud-based TTS module 116 may be configured to leverage the potentially much larger computing resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture module 110, which may then convert the textual data into computer-generated speech that is output locally. In some implementations, cloud-based TTS module 116 may be operably coupled with a database 115 that includes a plurality of voice synthesis models. Each voice synthesis model may be employed by automated assistant 120 to generate computer-speech that emulates a particular type of voice—e.g., a man, a woman, a cartoon character, speaker with a particular accent, etc.—when interacting with a user having a particular speaking proficiency and/or in a particular age group.

In some implementations, TTS module 116 may employ a particular voice synthesis model on demand. For example, suppose that automated assistant 120 is normally invoked with the phrase, "Hey Assistant." In some implementations, the model used to detect this phrase (e.g., the on-device invocation model described previously) may be modified, e.g., so that it responds to any utterance of "Hey, <entity>." In some such implementations, the requested <entity> may be used by TTS module 116 to select a voice synthesis model to employ. Thus, if a child invokes automated assistant by saying something like, "Hey, Hypothetical Hippo," then a voice synthesis modal associated with the entity "Hypothetical Hippo" may be employed.

Cloud-based STT module 117 may be configured to leverage the potentially much larger computing resources of the cloud to convert audio data captured by speech capture module 110 into text, which may then be provided to natural language understanding module 135. In various implementations, cloud-based STT module 117 may employ one or more custom parsers and/or STT models (sometimes referred to herein under the blanket term "query understanding models") that are specifically tailored towards interpreting speech of users with limited and/or underdeveloped vocabularies and/or grammars, such as children.

For example, in some implementations, cloud-based STT module 117 may be operably coupled with one or more databases 118 that store a plurality of query understanding models. Each query understanding model may be configured for use with a particular age range of users. In some implementations, each query understanding model may include an artificial intelligence model (e.g., various flavors of neural networks) that is trained to generate text from speech based on audio input (or data indicative of audio input, such as phonemes and/or other features of audio input extracted into a feature vector). In some such implementations, training data for such a model may include audio recordings from adults (or data indicative thereof) that has noise injected into it, e.g., labeled with the actual text of the speech. Additionally or alternatively, in some implementations, training data may include audio recording from children, labeled with the text of the children's speech.

In some implementations, cloud-based STT module 117 may convert an audio recording of speech to one or more phonemes, and then convert the one or more phonemes to text. Additionally or alternatively, in some implementations, STT module 117 may employ a state decoding graph. In some implementations, STT module 117 may generate a plurality of candidate textual interpretations of the user's utterance. With conventional automated assistants 120, the candidate textual interpretation having the highest associated confidence score may be accepted as the user's free-form input, so long as the confidence score satisfied some threshold and/or had a confidence score that was sufficiently better than confidence scores associated with other candidate textual interpretations. Otherwise, automated assistant 120 might ask the user for clarification and/or disambiguation. With STT modules 117 configured with selected aspects of the present disclosure, such thresholds may be lowered. Consequently, automated assistant 120 may be more likely to attempt to satisfy a user's intent even if the user's utterance (e.g., a statement from a toddler) demonstrates grammatical/vocabularic deficiency.

Automated assistant 120 (and in particular, cloud-based automated assistant components 119) may include a natural language understanding module 135, the aforementioned TTS module 116, the aforementioned STT module 117, and other components that are described in more detail below. In some implementations, one or more of the modules and/or modules of automated assistant 120 may be omitted, combined, and/or implemented in a component that is separate from automated assistant 120. In some implementations, to protect privacy, one or more of the components of automated assistant 120, such as natural language processor 122, TTS module 116, STT module 117, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via client device 106. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 of natural language understanding module 135 processes natural language input generated by user(s) via client device 106 and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological module that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding module 135 may also include an intent matcher 136 that is configured to determine an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" module 135.

Intent matcher 136 may use various techniques to determine an intent of the user, e.g., based on output from natural language processor 122 (which may include annotations and terms of the natural language input). In some implementations, intent matcher 136 may have access to one or more databases 137 that include, for instance, a plurality of mappings between grammars and responsive actions (or more generally, intents). In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" In addition to or instead of grammars, in some implementations, intent matcher 136 may employ one or more trained machine learning models, alone or in combination with one or more grammars. These trained machine learning models may also be stored in one or more databases 137, and may be trained to identify intents, e.g., by embedding data indicative of a user's utterance into a reduced dimensionality space, and then determine which other embeddings (and therefore, intents) are most proximate, e.g., using techniques such as Euclidean distance, cosine similarity, etc.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 119. One kind of user intent that may be identified by intent matcher 136 is to engage a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

In various implementations, intent matcher 136 may have access to, e.g., in database 137, a library of multiple sets of grammars and/or trained models. Each set of grammars and/or model may be designed to facilitate interaction between automated assistant 120 and a user of a particular age range and/or vocabulary level. In some implementations, these grammars and/or models may be part of the aforementioned "query understanding models," in addition to or instead of the models described above in relation to STT module 117 (e.g., stored in database 118). Thus, in some implementations, a query understanding model may include components used during both STT processing and intent matching. In other implementations, a query understanding model may include components used only during STT processing. In yet other implementations, a query understanding model may include components used only during intent matching and/or natural language processing. Any combination of these variations is contemplated herein. If query understanding models are employed during both STT processing and intent matching, then in some implementations, databases 118 and 137 may be combined.

As an example, a first set of grammars and/or model (or "query understanding model") stored in database 137 may be configured to facilitate interaction with very small children, e.g., toddlers under two. In some such implementations, such a set of grammars/model may have a relatively high tolerance for errors in grammar, vocabulary, pronunciation, etc., and may, for instance, do things like make an animal noise when the child speaks the name of an animal. Another set of grammars and/or model may be configured to facilitate engagement with children between two and four years old and/or others having limited vocabularies (e.g., users that are in the process of learning the language employed by automated assistant 120). Such a set of grammars and/or model may have a slightly lower tolerance for errors, though it still may be relatively lenient. Another set of grammars and/or model may be configured to facilitate engagement with a "next" age range and/or vocabulary, e.g., five to seven years old and/or intermediate speakers, and may be even less tolerant of errors. Yet another set of grammars and/or model may be configured to facilitate "normal" engagement with adults, older children, and/or other relatively proficient speakers—tolerance for errors in grammar, vocabulary, and/or pronunciation may be relatively low for such a set of grammars/model.

Fulfillment module 124 may be configured to receive the predicted/estimated intent that is output by intent matcher 136, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 124. As will be described below, the fulfillment information may in some implementations be provided to a natural language generator ("NLG" in some FIGS.) 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment module 124, which as depicted in FIG. 1 may be in communication with one or more search modules 150 configured to search corpuses of documents and/or other data sources (e.g., knowledge graphs, etc.) for responsive information. Fulfillment module 124 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 124.

Additionally or alternatively, fulfillment module 124 may be configured to receive, e.g., from natural language understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

In some implementations, and similar to other components herein such as STT module 117 intent matcher 136, fulfillment module 124 may have access to a database 125 that stores a library of rules, heuristics, etc., that are geared towards various age ranges and/or vocabulary levels. For example, database 125 may store one or more whitelists and/or blacklists of websites, universal resource identifiers (URI), universal resource locators (URL), domains, etc., that dictate what a user can, and cannot access depending on their age. Database 125 may also include one or more rules that dictate how and/or whether a user is able to cause automated assistant 120 to engage with a third party application, which as noted above can be used to, for instance, order goods or services.

As noted above, natural language generator 126 may be configured to generate and/or select natural language output (e.g., words/phrases that are designed to mimic human speech) based on data obtained from various sources. In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

If a user's intent is to search for general information, then natural language generator 126 may generate natural language output that conveys information responsive to the user's, e.g., in sentence form. In some instances, the natural language output may be extracted, e.g., by natural language generator 126, unaltered from documents (e.g., because it is already in complete sentence form) and provided as is. Additionally or alternatively, in some implementations, the responsive content may not be in complete sentence form (e.g., a request for today's weather may include a high temperature and chance of precipitation as standalone pieces of data), in which case natural language generator 126 may formulate one or more complete sentences or phrases which presents the responsive content as natural language output.

In some implementations, natural language generator 126 may rely on what will be referred to herein as "natural language generation templates" (or "NLG templates") to generate natural language output. In some implementations, NLG templates may be stored in database 127. NLG templates may include logic (e.g., if/else statements, loops, other programming logic) that dictates formulation of natural language output in response to various information from various sources, such as pieces of data included with fulfillment information generated by fulfillment module 124. Thus, in some ways an NLG template may, in effect, constitute a state machine, and may be created using any known programming language or other modeling language (e.g., Unified Modeling Language, Specification and Description Language, extensible markup language, etc.).

As an example, an NLG template may be configured to respond to English language requests for weather information. The NLG template may dictate which of a plurality of candidate natural language outputs are provided under a plurality of circumstances. For example, suppose fulfillment information generated by fulfillment module 124 indicates that the temperature will be above, say, 80 degrees Fahrenheit and there will be no clouds. Logic set forth in the NLG template (e.g., if/else statements) may dictate that the natural language output selected by natural language generator 126 be a phrase such as "It's gonna be a scorcher, don't forget your sunglasses." Suppose fulfillment information generated by fulfillment module 124 indicates that the temperature will be below, say, 30 degrees Fahrenheit and there will be snow. Logic set forth in the NLG template may dictate that the natural language output selected by natural language generator 126 be a phrase such as "It's gonna be chilly, you might want a hat and gloves, and be careful on the road." And so on.

In some implementations, NLG templates may include logic that is influenced by the detected vocabulary level and/or age range of the user. For example, an NLG template may have logic that causes a first natural language output to be provided if the user is predicted to be within a first age range, and a second natural language output to be provided if the user is predicted to be within another, e.g., older age range. The first natural language output may use more explanatory words and/or phrases, with simpler language, so that a young user may be more likely to understand it. The second natural language output may be pithier than the first natural language output, on the assumption that the older user does not need as much explanation.

In the weather example above, adults and children may be told different things based on the logic in the NLG template. For example, if the weather will be cold, a detected child might be provided with natural language output that reminds the child to take precautions that an adult would not need to be reminded of. For example, the natural language output provided to a child may be, "It's gonna be COOOLLDD outside and may even snow! Don't forget your coat, scarf, mittens, and hat. Also, make sure to let a grownup know that you will be outside." By contrast, the natural language output provided to an adult under the same circumstances may be, "It's going to be 30 degrees Fahrenheit, with a 20% chance of snow."

As another example, a NLG template may be configured to respond to queries about whether certain entities are real of fictitious, e.g., "Is <entity_name> real?" Such an NLG template may include logic that chooses from multiple options depending on the user's predicted age range. Suppose a user asks, "Is the tooth fairy real?" If the user is predicted to be a small child, then the logic within the NLG template may dictate that the answer be something like, "Yes, the tooth fairy leaves money under pillows of children when they lose teeth." If the user is predicted to be an adult, the logic within the NLG template may dictate that the answer is something like, "No, the tooth fairy is a make-believe entity employed by parents and guardians to motivate children to pull already-lose teeth in order to get money in exchange."

Figure 2:
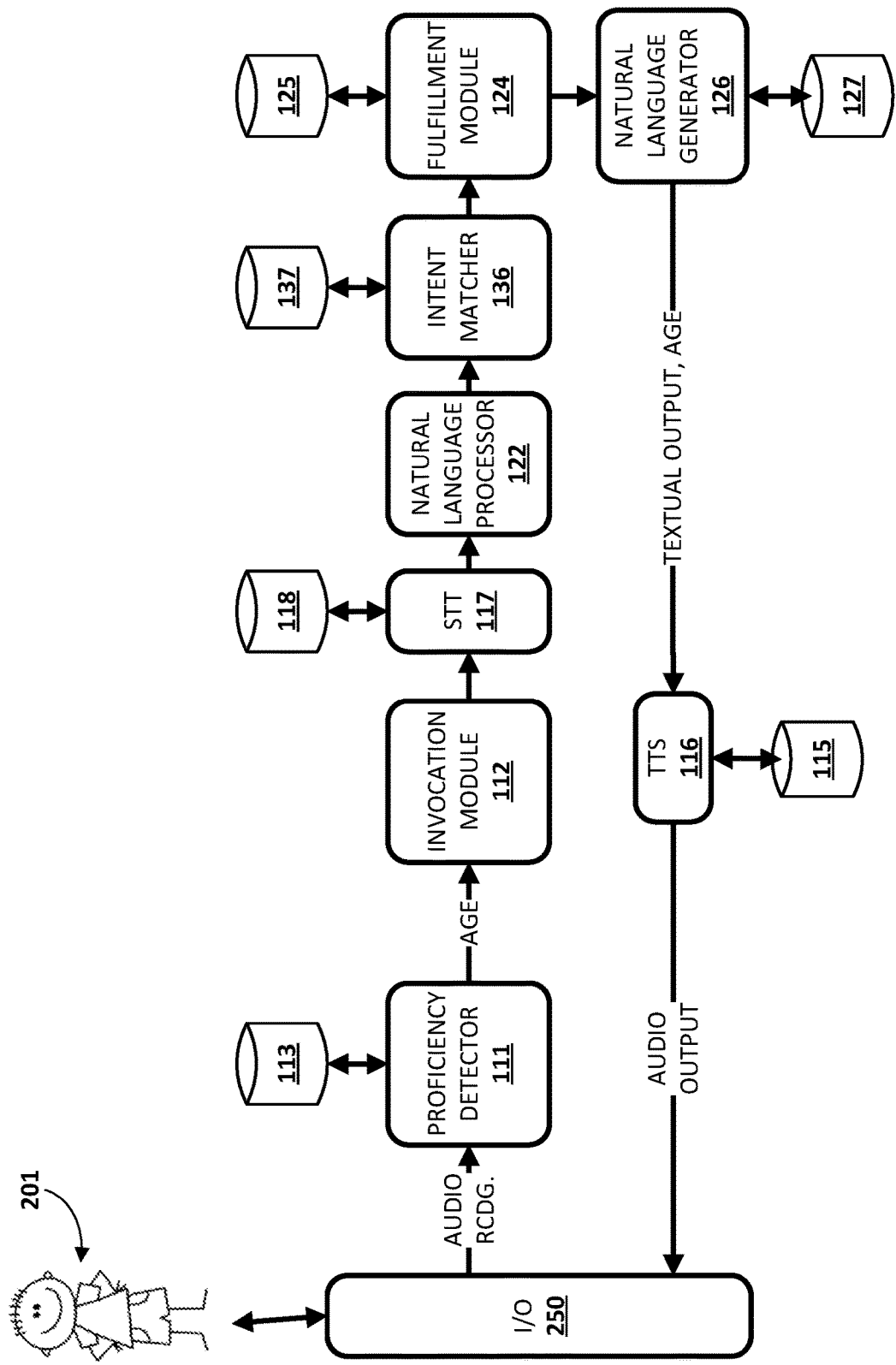
FIG. 2 depicts an example process flow that demonstrates various aspects of the present disclosure, in accordance with various implementations.

FIG. 2 demonstrates an example of how an utterance from a user 201 may be processed through the various components of FIG. 1, depending on the predicted/estimated age of user 201. Components that are relevant to techniques described herein are depicted, but this is not meant to be limiting, and various other components not depicted in FIG. 2 may be used as part of processing the user's utterance.

When the user provides a vocal utterance, input/output ("I/O") component(s) of the client device (e.g., 106) operated by user 201, such as a microphone, may capture the user's utterance as an audio recording ("AUDIO RCDG." in FIG. 2). The audio recording may be provided to proficiency detector 111, which as described above predicts and/or estimates an age range and/or a vocabulary level of user 201.

The estimated age range or vocabulary level is then provided to invocation module 112. Based on the estimated age range and data indicative of the user's utterance (e.g., audio recording, feature vector, embedding), invocation module 112 may classify the user's utterance as intended, or not intended, to trigger automated assistant 120. As noted above, a threshold that must be satisfied in order for invocation module 112 to classify the utterance as a proper invocation may be lowered for a child or another user having a relatively low vocabulary level.

In some implementations, the threshold employed by invocation module 112 may be lowered based on other signals as well, such as detected ambient noise, motion (e.g., driving a vehicle), etc. One reason for lowering the threshold based on these other signals is that when these other signals are detected, there may be more noise present in the user's utterance than if the user's utterance were made in a quiet environment. Under such circumstances, especially if the user is driving or riding a bike, it may be desirable for automated assistant 120 to be more easily invoked.

Referring back to FIG. 2, once automated assistant 120 is triggered, STT module 117 may use the audio recording (or data indicative of the user's utterance) in conjunction with the estimated age range/vocabulary level to select one or more thresholds and/or models (e.g., from database 113). As noted above, these thresholds/models may be part of a "query understanding model." STT module 117 then may generate, as output, a textual interpretation of the user's utterance. This textual interpretation may be provided to natural language processor 122, which annotates and/or otherwise processes the textual interpretation as described above. The output of natural language processor 122, along with the estimated age range or vocabulary level of user 201, is provided to intent matcher 136.

Intent matcher 136 may select, e.g., from database 137, one or more grammars and/or models based on the detected/predicted age of user 201. In some implementations, some intents may be unavailable due to the predicted/estimated age range or vocabulary level of user 201. For example, intents that involve automated assistant 120 interacting with third party applications—particularly third party applications that require the expenditure of funds and/or that otherwise are not appropriate for children—may not be permitted, e.g., by one or more rules stored in database 137, when the user's estimated age range or vocabulary level is determined to be, for instance, below a threshold. Additionally or alternatively, in some implementations, these rules may be stored and/or implemented elsewhere, e.g., in database 125.

The intent determined by intent matcher 136, along with the estimated age range or vocabulary level and any user-provided slot values (if applicable), may be provided to fulfillment module 124. Fulfillment module 124 may fulfill the intent in accordance with various rules and/or heuristics stored in database 125. The fulfillment information generated by fulfillment module 124 may be passed to natural language generator 126, e.g., along with the user's estimated age range and/or vocabulary level. Natural language generator 126 may be configured to generate natural language output in accordance with the fulfillment information and the user's estimated age range and/or vocabulary level. For example, and as described previously, natural language generator 126 may implement one or more NLG templates that include logic that depends on the user's estimated age range and/or vocabulary level to generate natural language output.

The textual output generated by natural language generator 126, along with the user's estimated age range and/or vocabulary level, may be provided to TTS module 116. TTS module 116 may select, from database 115 based on the user's estimated age range and/or vocabulary level, one or more voice synthesizers to be used by automated assistant 120 to convey the audio output to the user. The audio output generated by TTS module 116 may be provided to one or more I/O components 250 of the client device operated by user 201, so that it may be output audibly via one or more speakers and/or visually on one or more displays.

Figure 3A:
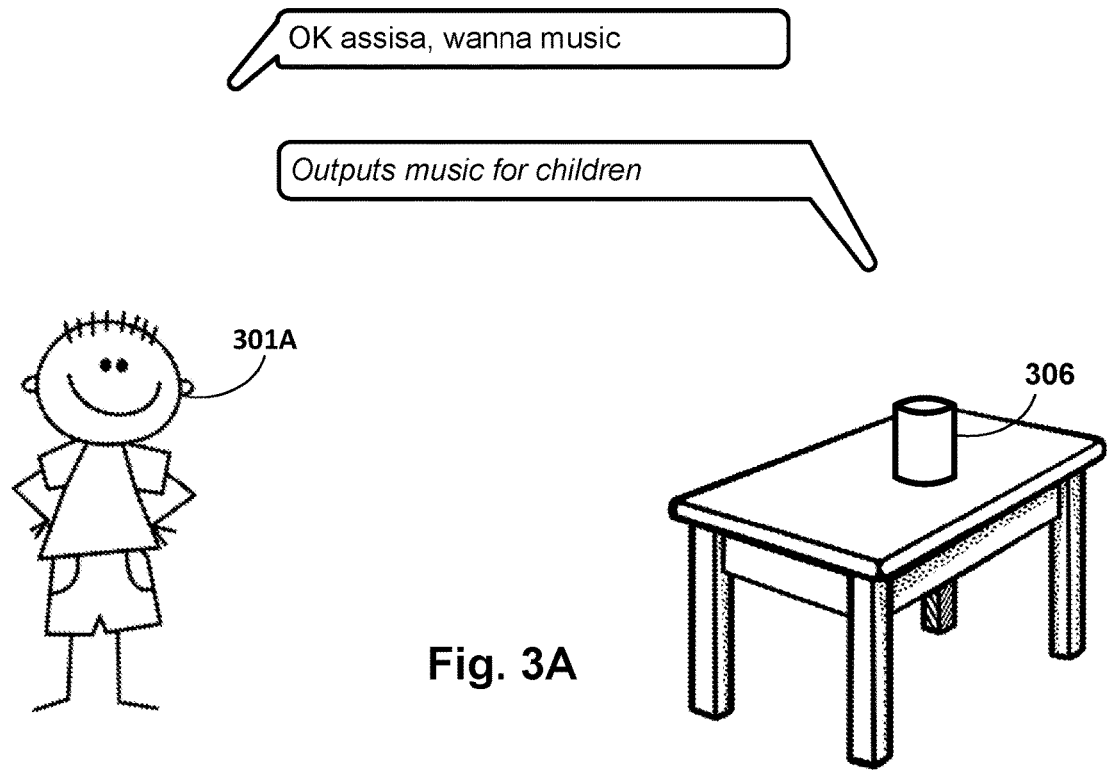
FIGS. 3A and 3B depict example dialogs between a user and an automated assistant, in accordance with various implementations.
Figure 3B:
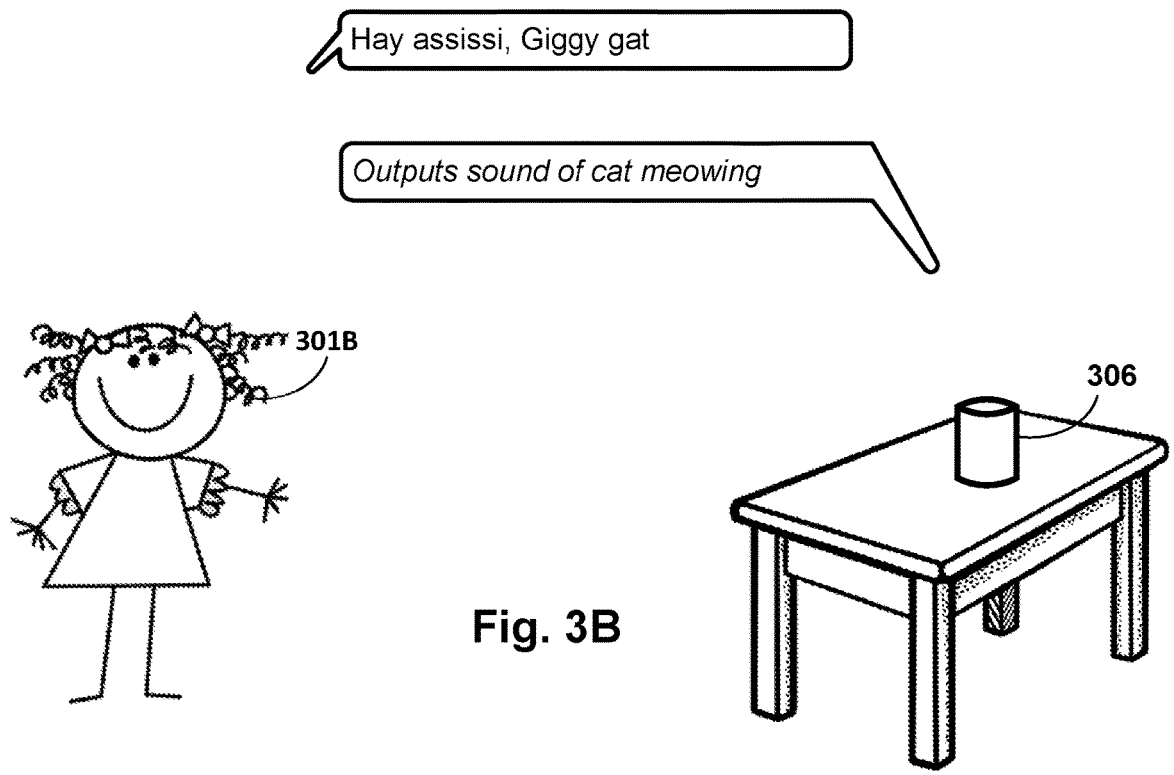

FIGS. 3A and 3B depict examples scenarios in which techniques described herein may be employed. In FIG. 3A, a first user 301A is a relatively young child that is attempting to engage with automated assistant 120 that operates at least in part on a client device 306. In this example, client device 306 takes the form of an assistant device, and more specifically, a standalone interactive speaker, but this is not meant to be limiting.

First user 301A says, "OK, Assisa, wanna music," which may be captured as an audio recording and/or as a vector of features extracted from the audio recording. Automated assistant 120 may first estimate an age range of user 301A based on the audio recording/feature vector. In some implementations, proficiency detector 111 may analyze features such as phonemes, pitch, cadence, etc., to estimate the age of user 301A. Additionally or alternatively, in some implementations, the audio recording may be processed by other components of automated assistant 120, such as STT module 117, to generate a textual interpretation of the user's utterance. This textual interpretation may be analyzed, e.g., by proficiency detector 111, to estimate/predict grammatical and/or vocabularic proficiency of user 301A (which in some cases may be used as a proxy for the user's age).

Once automated assistant 120 has been invoked, it may analyze the remainder of the utterance from user 301A, "Wanna music." Such a phrase might cause a conventional automated assistant to seek disambiguation and/or clarification from user 301A. However, automated assistant 120 configured with selected aspects of the present disclosure may have a tolerance for grammatical, vocabularic, and/or pronunciation errors that is higher than that of a conventional automated assistant. Consequently, and using a process such as that described previously with respect to FIG. 2, various components of automated assistant 120 may use the estimated age range and/or vocabulary level to select, at different points in the pipeline of FIG. 2, various models, rules, grammars, heuristics, etc., to process and fulfill the user's request. In this case, automated assistant 120 may respond by outputting music for children (e.g., nursery rhymes, songs from children's television and movies, educational music, etc.).

FIG. 3B depicts another example with another child user 301B once again interacting with automated assistant 120 using client device 306. In this example, user 301B once again speaks an utterance, "Hay assissi, Giggy gat," that would not be interpretable by a conventional automated assistant. However, automated assistant 120 configured with selected aspects of the present disclosure may estimate/predict that user 301B is in a low age range, e.g., 2-3. Consequently, automated assistant 120 may be more tolerant of grammatical, vocabulary, and/or pronunciation errors. Because it is a child that is engaged with automated assistant, the phrase "giggy gat" may be more permissively interpreted as "kitty cat."

Moreover, if an adult user where to invoke automated assistant 120 and simply say, "kitty cat," automated assistant 120 may not be able to respond because the adult user's intent is unclear. However, using techniques described herein, automated assistant 120, e.g., by way of intent matcher 136 and/or fulfillment module 124, may determine, based on this interpretation and the estimated age range of user 301B, the intent of user 301B as being to hear the sound a cat makes. As a result, automated assistant 120 may output the sound of a cat meowing.

Figure 4A:
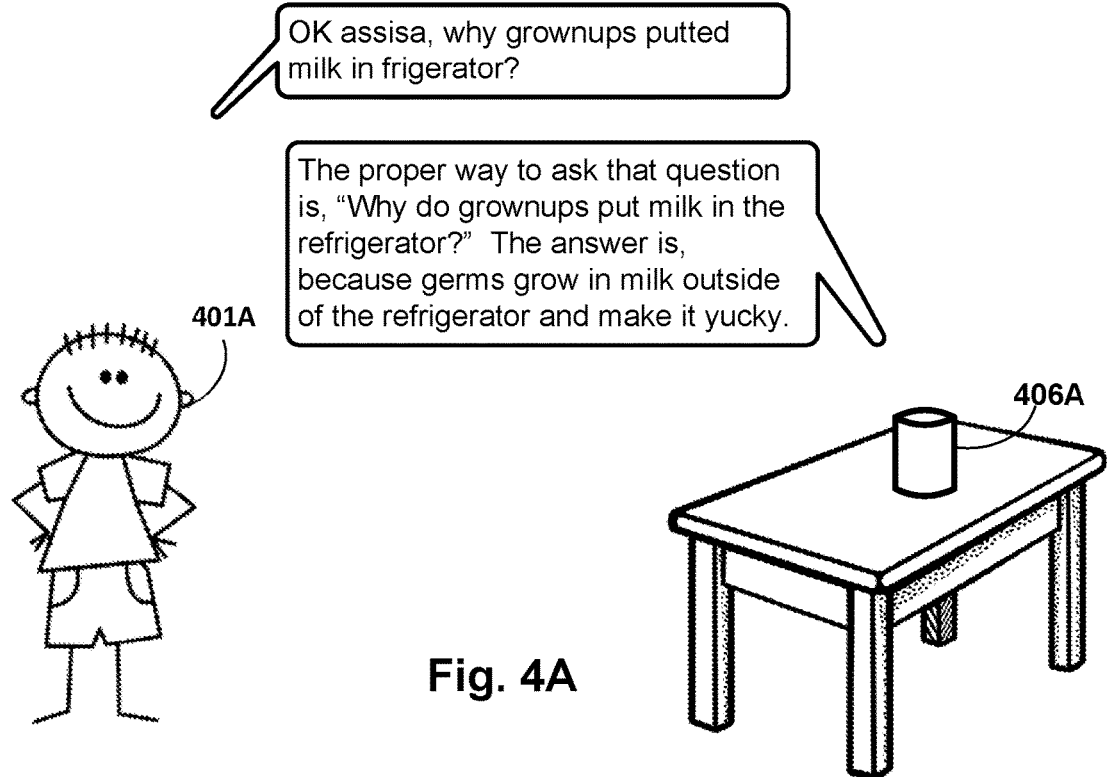
FIGS. 4A and 4B depict example dialogs between a user and an automated assistant, in accordance with various implementations.

FIG. 4A depicts yet another example of a child user 401A interacting with automated assistant 120 operating at least in part on client device 406A, which once again takes the form of an assistant device, and more specifically, a standalone interactive speaker. In this example, user 401A asks, "OK assisa, why grownups putted milk in frigerator?" Such a question may not be interpretable by a conventional automated assistant due to its various grammatical and vocabularic errors, as well as the various mispronunciations. However, an automated assistant 120 configured with selected aspects of the present disclosure may be more tolerant of such errors, and therefore may be able to process the question from user 401A. Additionally, in some implementations, automated assistant 120 may be configured to teach user 401A proper grammar and/or vocabulary. This is equally true whether the user is a child (as in FIG. 4A) or a user for which the language used by automated assistant 120 is non-native.

In FIG. 4A, before answering the user's question, automated assistant 120 states, "The proper way to ask that question is, 'Why do grownups put milk in the refrigerator?'" This statement is meant to guide user 401A as to proper grammar, vocabulary, and/or pronunciation. In some implementations, automated assistant 120 may monitor a particular user's utterances over time to determine whether the user's vocabulary is improving. In some such implementations, if the user demonstrates an increased vocabulary level from one dialog session to the next, automated assistant 120 may congratulate the user or otherwise provide encouragement, e.g., for the user to continue to improve linguistically. In some implementations, another user, such as a child's parent, teacher, or guardian, may ask automated assistant 120 for an update on the child's linguistic progress. Automated assistant 120 may be configured to provide data (e.g., as natural language output, as results displayed on a screen, etc.) indicative of the child's progress.

Once automated assistant 120 has provided user 401A with linguistic guidance, it then provides information (e.g., obtained from one or more websites by fulfillment module 124) that is responsive to the user's query, but in a manner that is selected based on the estimated age range and/or vocabulary of user 401A. In this example, automated assistant 120 explains, "because germs grow in milk outside of the refrigerator and make it yucky." Such an answer is clearly tailored to a child. This may be accomplished in various ways. In some implementations, a component such as fulfillment module 124 and/or natural language generator 126 may—based on an estimation that user 401A is a child—replace relatively complex words such as "bacteria," "spoil," "perishable," or "curdle" with simpler terms such as "germs" and "yucky." Had an adult asked the same question, automated assistant 120 may have generated an answer such as, "Milk is a perishable food and therefore is at risk when kept outside a refrigerator. Milk must be stored in a refrigerator set to below 40° F. for proper safety." In other implementations, one or more NLG templates might be employed to influence the output towards the estimated age range and/or vocabulary level of user 401A.

In various implementations, a variety of different functionalities may be made available (or blocked) depending on the user's predicted age. For example, in some implementations, a variety of games or other activities geared towards children may be available to a child user. In some such implementations, different games may be made available and/or recommended to the user depending on the user's predicted age range. Additionally or alternatively, the same games may be available/recommended, but may be set to be more difficult for users in more advanced age ranges.

Figure 4B:
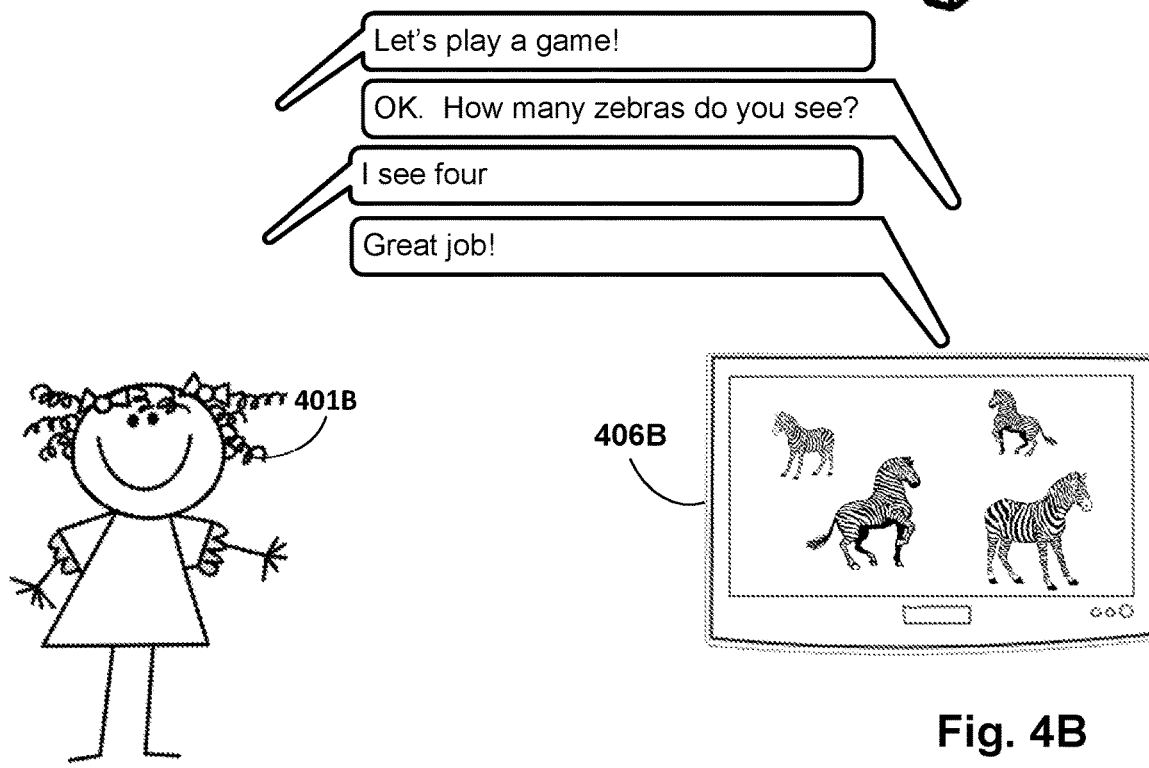

FIG. 4B depicts another example scenario in which a child user 401B interacts with automated assistant 120. Unlike previous examples, in this example, automated assistant 120 operates at least in part on a client device 406B taking the form of a smart television or a standard television equipped with a digital media player dongle (not depicted). In this example, it can be assumed that automated assistant 120 has already predicted/estimated that user 401B is a small child, e.g., in the range of two to four years old.

In this example, user 401B utters, "Let's play a game." Based on the user's predicted age range, automated assistant 120 may select a game to play, e.g., randomly from a group of games tailored towards the age range of user 401B and/or stochastically from all games (with games geared towards the age range of user 401B weighted more heavily). Additionally or alternatively, user 401B may be presented with a list (e.g., visually on client device 406B) of games that are appropriate for user 401B.

Automated assistant 120 then causes client device 406B to render four zebras (e.g., still images, animations, etc.) visually on its display. Automated assistant 120 asks, "How many zebras do you see?" After counting, user 401B responds, "I see four." In other implementations, user could say something like "I see this many," and hold up her fingers. Automated assistant 120 may, e.g., by analyzing a digital image captured by a camera (not depicted) of client device 406B, count the fingers. Either way, automated assistant 120 may determine that "four" matches the number of rendered zebras, and may respond, "Great job!"

In FIG. 4B, user 401B engages with automated assistant 120 exclusively using the smart television (or standard television equipped with a smart television dongle). However, this is not meant to be limiting. In other implementations, user 401B may engage with automated assistant 120 using a different client device, such as a standalone interactive speaker, and the visual aspects of this example may nonetheless be rendered on a television screen. For example, the smart television and the interactive standalone speaker may be part of the same coordinated "ecosystem" of client devices that are, for instance, controlled by a single user (e.g., a parent or head-of-household) or associated with all members of a family (or other group such as co-workers, neighbors, etc.).

In some implementations, detected/predicted/estimated characteristics of a user may be used, e.g., by automated assistant 120, as slot values for use in performing various tasks. These tasks may include, for instance, automated assistant 120 engaging with one or more "agents." As noted previously, as used herein, "agents" may refer to processes that receive, e.g., from automated assistant or elsewhere, input such as slot values, intents, etc., and provide output in response. A web service is one example of an agent. Third party applications described above can also be considered agents. The agent may use the slot value provided by automated assistant for various purposes, such as fulfilling the user's request.

Figure 5A:
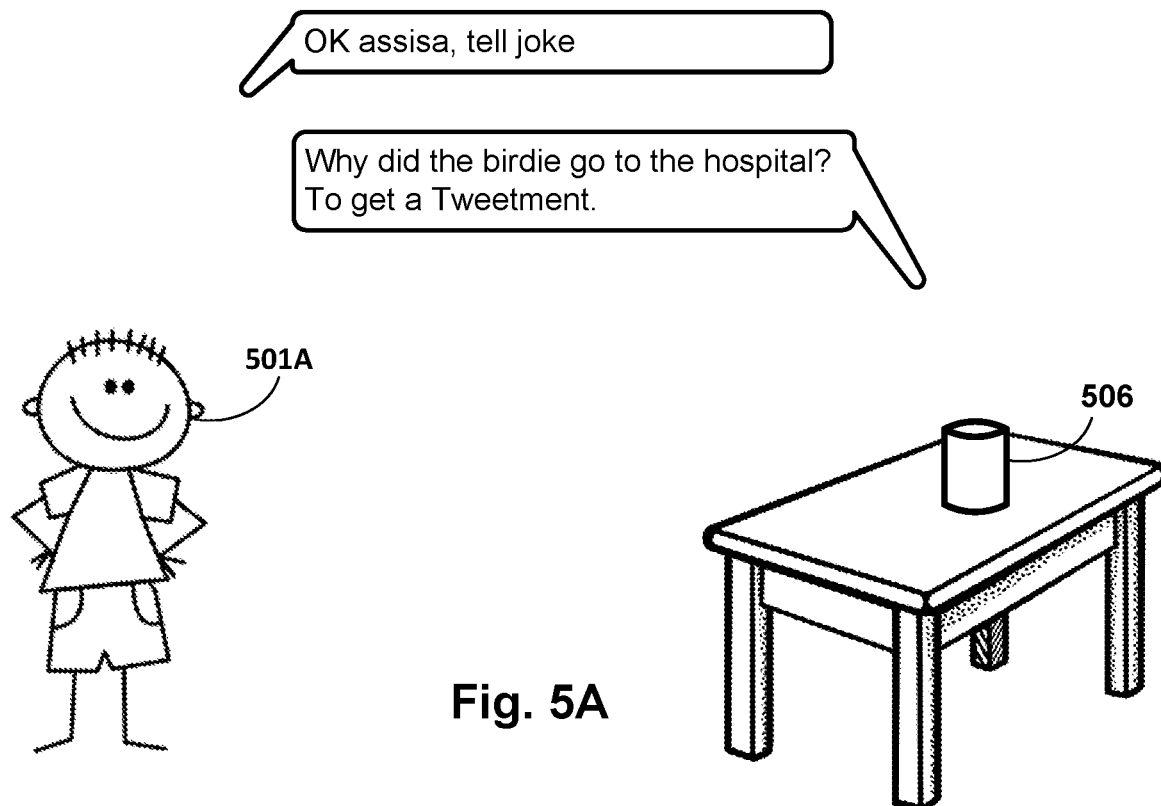
FIGS. 5A and 5B depict example dialogs between a user and an automated assistant, in accordance with various implementations.
Figure 5B:
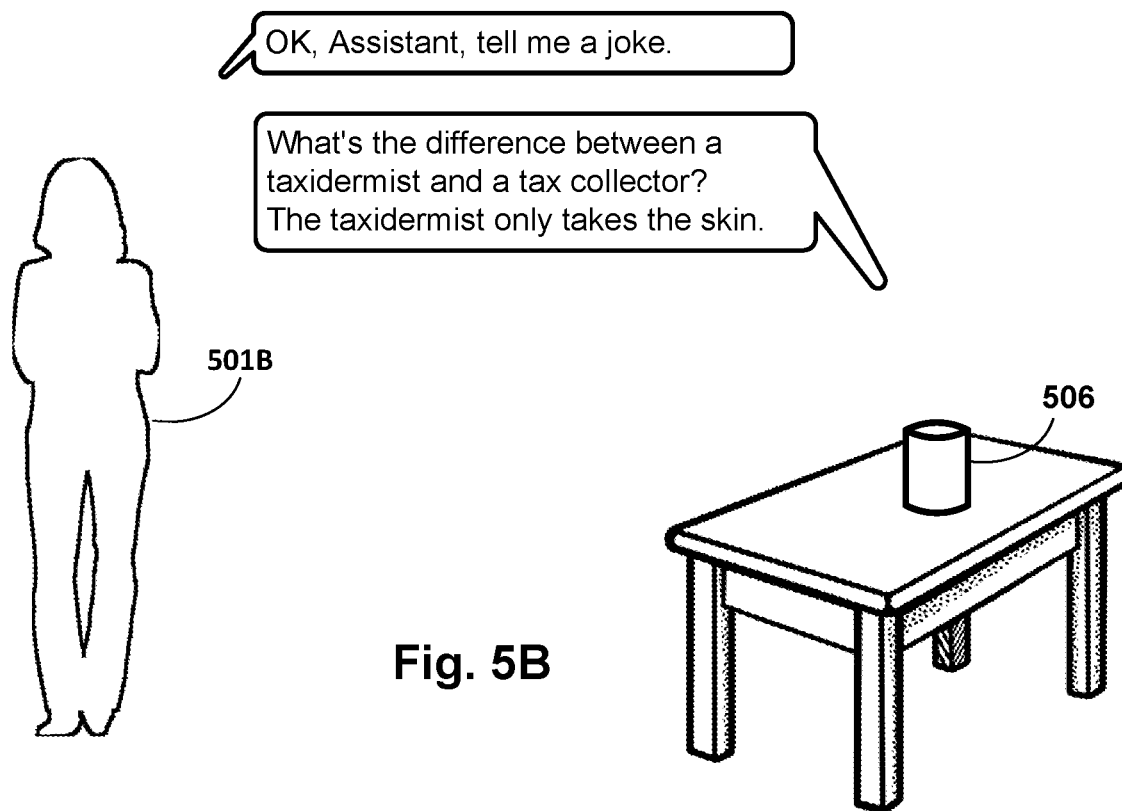

FIGS. 5A and 5B depict one example of how a user's age range may be used as a slot value that causes different responses to be elicited from the same agent, which in this example is a third party application in the form of a joke service. In this example, the third party agent accepts a slot value indicative of the user's age, and selects an appropriate joke based at least in part on that slot value. That way, jokes told by automated assistant 120 are audience-appropriate.

In FIG. 5A, user 501A is a small child. Accordingly, when he asks for a joke, automated assistant 120 executing at least in part on client device 506 (taking the form once again of a standalone interactive speaker) provides the child's predicted/estimated age range to the third party joke services. The joke service selects and provides, for output by automated assistant 120, a joke that is age-appropriate: "Why did the birdie go to the hospital? To get a Tweetment."

Contrast that to FIG. 5B, in which case user 501B is an adult. In this example, user 501B makes the exact same request: "OK, Assistant, tell me a joke." Because the utterance from user 501B is better formed and/or more grammatically correct than the utterance by user 501A in FIG. 5A, user 501B is identified as an adult (or at least not a small child). Consequently, user 501B is provided with a joke that is more age appropriate for her: "What's the difference between a taxidermist and a tax collector? The taxidermist only takes the skin."

Examples described herein have related to estimating users' ages (or age ranges) and vocabulary levels, and operating automated assistant 120 in a manner that accommodates these estimations. However, this is not meant to be limiting. Other characteristics of the user may be predicted/estimated based on their utterance. For example, in some implementations, the user's gender may be estimated and used to influence various aspects of how automated assistant 120 operates. As an example, suppose a user is experiencing a particular medical symptom that signifies different things for different genders. In some implementations, automated assistant 120 may use the predicted user gender to select, from multiple potentially conflicting snippets of information obtained from various medical websites, snippets that are appropriate to the user's gender. As another example, in the joke context of FIGS. 5A-B, male users and female users may be presented with different jokes.

Figure 6:
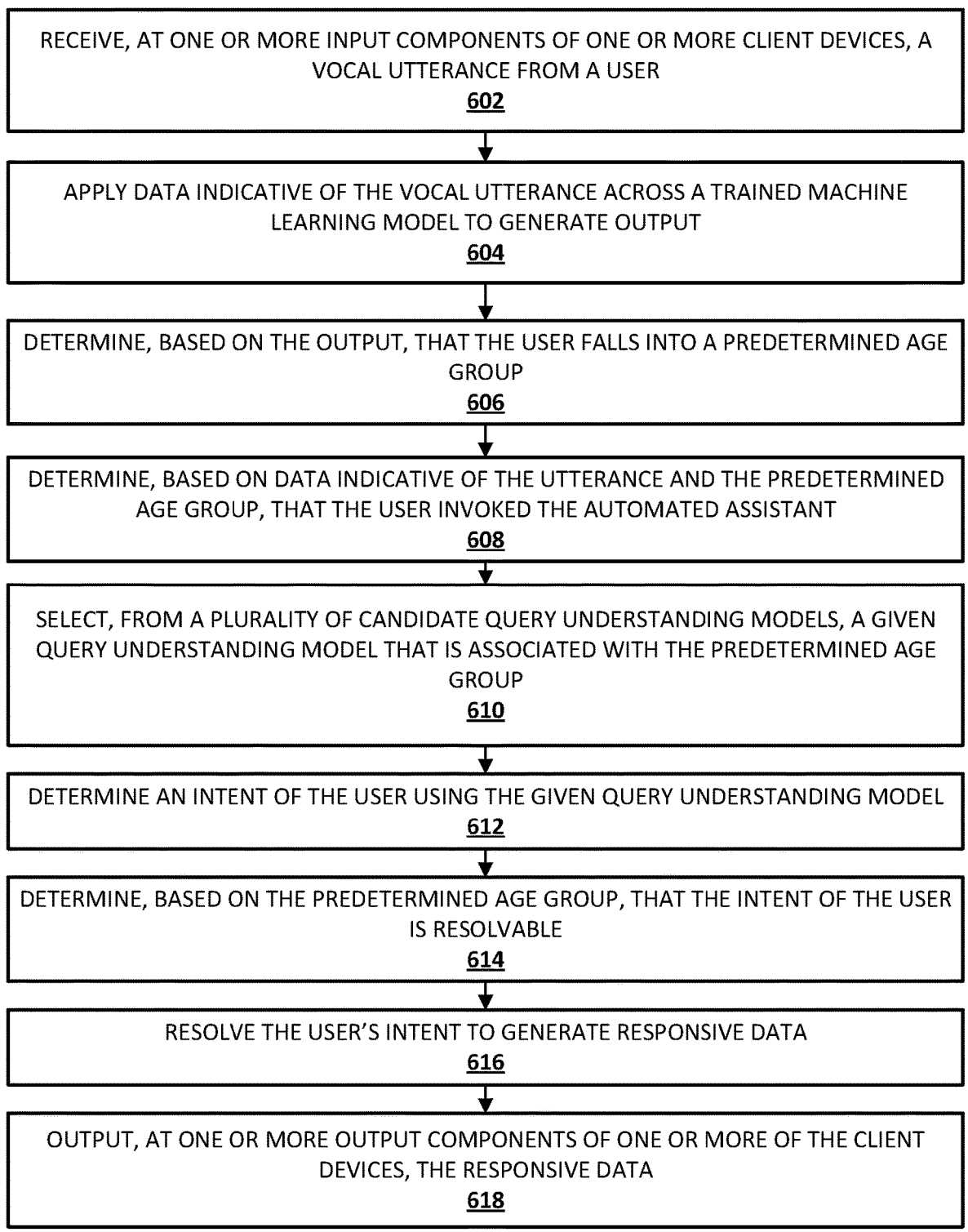
FIG. 6 depicts a flowchart illustrating an example method according to implementations disclosed herein.

FIG. 6 is a flowchart illustrating an example method 600 according to implementations disclosed herein. For convenience, the operations of the flow chart are described with reference to a system that performs the operations. This system may include various components of various computer systems, such as one or more components of computing systems that implement automated assistant 120. Moreover, while operations of method 600 are shown in a particular order, this is not meant to be limiting. One or more operations may be reordered, omitted or added.

At block 602, the system may receive, at one or more input components (e.g., a microphone) of one or more client devices, a vocal utterance from a user. At block 604, the system (e.g., by way of proficiency detector 111) may apply data indicative of the vocal utterance (e.g., an audio recording, feature vector) across a trained machine learning model to generate output. At block 606, the system may determine, based on the output generated at block 604, that the user falls into (or should be classified as) a predetermined age group, e.g., of a plurality of predefined age groups. In other implementations, the user may be classified into other categories, such as gender.

At block 608, the system (e.g., invocation module 112) may determine, based on the predetermined age group of the user and data indicative of the utterance, that the user invoked automated assistant 120. For example, an on-device model used by invocation module 112 may be trained to classify the user's utterance as an invocation or not an invocation, e.g., depending on whether an invocation score generated based on the model satisfies some threshold. In some implementations, this threshold may be altered, e.g., downward or upward, when the user is determined to be a child or otherwise linguistically deficient. Consequently, if the user is detected to be a child, it may be more likely to classify the child's utterance as an invocation than if the user were an adult. In other words, it may be easier for children (or other users) with limited vocabularies to invoke automated assistant 120 than for adults or other users with relatively advanced vocabulary levels.

At block 610, the system may select, from a plurality of candidate query understanding models, a given query understanding model that is associated with the predetermined age group. As noted above, this query understand model may include components that are used by STT module 117 to generate speech recognition output and/or components that are used by intent matcher 136 to determine the user's intent.

At block 612, the system, e.g., by way of intent matcher 136, may determine an intent of the user using the given query understanding model. As described previously, in some implementations, the given query understand model may require less precision when determining the user's intent when the user is a child and their utterance is not grammatically correct or easily understood, as compared to when the user is adult and more precision is expected.

At block 614, the system may determine, based on the predetermined age group, that the intent of the user is resolvable. For example, if the predetermined age group is that of small children, then intents that require payment of funds for fulfillment may not be resolvable. At block 616, the system, e.g., by way of fulfillment module 124, may fulfill (or resolve) the user's intent to generate responsive data (e.g., fulfillment data described previously). At block 618, the system may output, at one or more output components of one or more of the client devices (e.g., a speaker, a display screen, etc.), the responsive data.

In the examples described herein, automated assistant 120 may be transitioned into kids mode so that it may be more tolerant of less-than-perfect grammar, provide output that is suitable for children, ensure that children cannot access inappropriate content and/or trigger actions that, for instance, cost money. However, this is not meant to be limiting, and other aspects of how a client device operates may be affected by automated assistant 120 transitioning into kid's mode. For example, in some implementations, a volume setting may be capped when in kid's mode to protect children's hearing.

Also, and was alluded to previously, in some implementations, when in kid's mode automated assistant 120 may provide a variety of games using basic client device features, e.g. guessing an animal based on an output animal noise, guessing a number between 1 and 100 (higher/lower), answering riddles or trivia, etc. Riddles or trivia questions, for instance, may be selected based on their difficulties and the user's estimated age range: younger users may receive easier riddles/trivia questions.

Sometimes it might be the case that a particular assistant device is used mostly by children. For example, a standalone interactive speaker may be deployed in a kid's play area. In some implementations, such an assistant device may be configured, e.g., by a parent, so that an automated assistant that is engaged using the assistant device is, by default, in kid's mode. When in the default kid's mode, the automated assistant may exhibit one or more of the various behaviors described previously, e.g., being more tolerant of grammatical and/or vocabularic errors, more proactive when engaging with children, etc. Should an adult such as a parent desire to engage with automated assistant 120 using that particular assistant device, the adult may (at least temporarily) transition the assistant device to a non-kid's mode, e.g., by speaking a special invocation phrase that is baked into the invocation model employed by invocation module 112.

In some implementations, rather than predicting or estimating a speaker's age range, automated assistant 120 may be configured to perform voice recognition to authenticate the speaker. For example, members of a family may each train automated assistant 120 to recognize their voices, e.g., so that automated assistant 120 is aware of whom it is engaged with. The users may have profiles that include, among other things, their ages/birthdays. In some implementations, automated assistant 120 may use these profiles to definitively ascertain a user's precise age, rather than estimating their age range. Once the user's age is determined, automated assistant 120 may operate as described above in a manner that is appropriate for the user's age.

Figure 7:
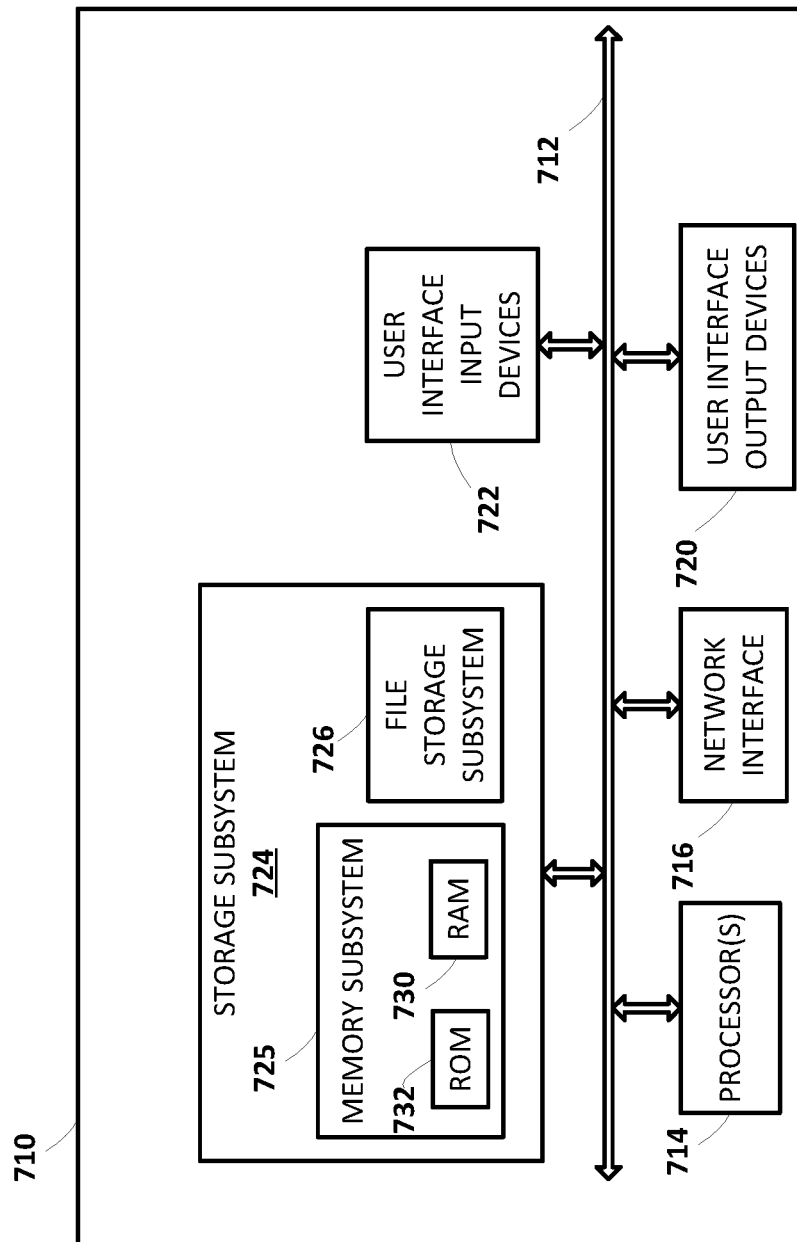
FIG. 7 illustrates an example architecture of a computing device.

FIG. 7 is a block diagram of an example computing device 710 that may optionally be utilized to perform one or more aspects of techniques described herein. In some implementations, one or more of a client computing device, user-controlled resources module 130, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 6, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, in some implementations, users may opt out of having automated assistant 120 attempt to estimate their age range and/or vocabulary level.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   receiving, at one or more input components of one or more client devices, a vocal utterance from a user;
   applying data indicative of the vocal utterance across a trained machine learning model to generate output;
   determining, based on the output, that the user falls into a predetermined age group;
   based on the predetermined age group, selecting a grammatical tolerance associated with the predetermined age group;
   determining an intent of the user using a given query understanding model;
   determining, based on the grammatical tolerance associated with the predetermined age group, that the intent of the user is resolvable;
   resolving the user's intent to generate responsive data; and
   outputting, at one or more output components of one or more of the client devices, the responsive data.

2. The method of claim 1, further comprising selecting from a plurality of candidate query understanding models, the given query understanding model.

3. The method of claim 2, wherein the given query understanding model is selected based on the predetermined age group.

4. The method of claim 3, wherein the plurality of candidate query understanding models include at least one candidate query understanding model with a grammatical tolerance that is different than the grammatical tolerance associated with the predetermined age group.

5. The method of claim 1, wherein the data indicative of the vocal utterance comprises an audio recording of an utterance by the user, and the trained machine learning model is trained to generate output indicative of an age of the user based on one or more phonemes contained in the audio recording.

6. The method of claim 1, further comprising selecting, from a plurality of candidate natural language generation models, a given natural language generation model that is associated with the predetermined age group, wherein the selected given natural language generation model is used to generate the responsive data.

7. The method of claim 6, wherein the plurality of candidate natural language generation models include at least one candidate natural language generation model that uses a larger vocabulary than a vocabulary used by the given natural language generation model.

8. The method of claim 1, wherein the vocal utterance comprises a request for information, and resolving the intent includes summarizing information from a webpage that is responsive to the request for information, wherein the webpage is summarized at a degree of complexity that is commensurate with the predetermined age group.

9. The method of claim 1, wherein the given query understanding model is applied to perform speech-to-text processing of the vocal utterance.

10. The method of claim 1, wherein the given query understanding model is applied to perform natural language understanding of speech recognition output generated from the vocal utterance.

11. The method of claim 1, wherein the grammatical tolerance comprises a minimum confidence threshold, and determining that the intent of the user is resolvable includes determining that a confidence measure generated for the vocal utterance satisfies the minimum confidence threshold.

12. A system comprising one or more processors and memory storing instructions that, in response to execution by the one or more processors, cause the one or more processors to:
   receive, at one or more input components of one or more client devices, a vocal utterance from a user;
   apply data indicative of the vocal utterance across a trained machine learning model to generate output;
   determine, based on the output, that the user falls into a predetermined age group;
   based on the predetermined age group, selecting a grammatical tolerance associated with the predetermined age group;
   determine an intent of the user using a given query understanding model;
   determine, based on the grammatical tolerance associated with the predetermined age group, that the intent of the user is resolvable;
   resolve the user's intent to generate responsive data; and
   output, at one or more output components of one or more of the client devices, the responsive data.

13. The system of claim 12, further comprising instructions to select from a plurality of candidate query understanding models, the given query understanding model.

14. The system of claim 13, wherein the given query understanding model is selected based on the predetermined age group.

15. The system of claim 13, wherein the plurality of candidate query understanding models include at least one candidate query understanding model with a grammatical tolerance that is different than the grammatical tolerance associated with the predetermined age group.

16. The system of claim 12, wherein the data indicative of the vocal utterance comprises an audio recording of an utterance by the user, and the trained machine learning model is trained to generate output indicative of an age of the user based on one or more phonemes contained in the audio recording.

17. The system of claim 12, further comprising instructions to select, from a plurality of candidate natural language generation models, a given natural language generation model that is associated with the predetermined age group, wherein the selected given natural language generation model is used to generate the responsive data.

18. The system of claim 12, wherein the vocal utterance comprises a request for information, and resolving the intent includes summarizing information from a webpage that is responsive to the request for information, wherein the webpage is summarized at a degree of complexity that is commensurate with the predetermined age group.

19. The system of claim 12, wherein the given query understanding model is applied to perform natural language understanding of speech recognition output generated from the vocal utterance.

20. The system of claim 12, wherein the grammatical tolerance comprises a minimum confidence threshold, and determining that the intent of the user is resolvable includes determining that a confidence measure generated for the vocal utterance satisfies the minimum confidence threshold.

* * * * *